Sept. 28, 1948. H. T. BROWN ET AL 2,450,394
PREPARATION OF SPHEROIDAL CATALYSTS
Filed July 31, 1943
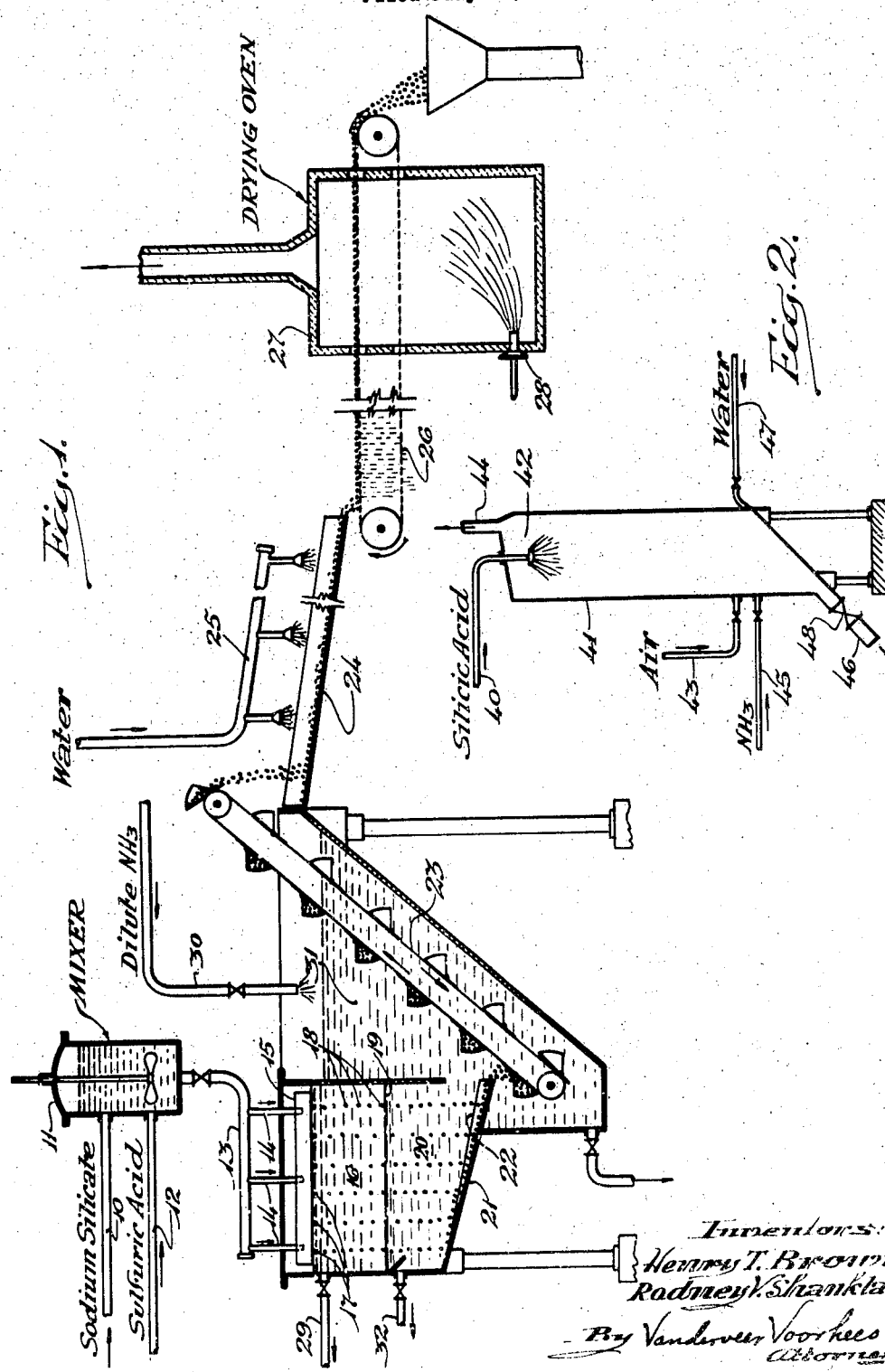

Patented Sept. 28, 1948

2,450,394

UNITED STATES PATENT OFFICE 2,450,394

PREPARATION OF SPHEROIDAL CATALYSTS

Henry Trueheart Brown, Whiting, Ind., and Rodney V. Shankland, Chicago, Ill., assignors to Standard Oil Company, Chicago, Ill., a corporation of Indiana Application July 31, 1943, Serial No. 496,844

9 Claims. (Cl. 252—259.2)

This invention relates to a new, improved form of catalyst and a method of making it, and the invention relates particularly to a method of making gel catalysts which are useful in the conversion of hydrocarbons such as petroleum oils, gases, etc. One object of the invention is to make a catalyst of great physical strength which can be handled in chemical processes with a minimum of loss by attrition. Another object of the invention is to facilitate the washing and drying of gel catalysts by forming the catalyst in discrete particles of uniform size and shape.

The invention is illustrated by a drawing which shows diagrammatically in Figure 1 an apparatus for preparing the catalyst according to one modification of our process, wherein the catalyst particles are formed by suspension in a liquid medium. Figure 2 shows another modification wherein the catalyst particles are formed by suspension in a gaseous medium.

In the conversion of hydrocarbons, for example, in the cracking of heavy oils, gas oils, residual stocks, etc., to make gasoline; the reforming or hydroforming of lighter stocks, napthas, etc., to increase their knock rating when used as motor fuels or to produce aromatic hydrocarbons such as benzene, toluene and xylene; the polymerization of gases, for example propylene and butylene, into higher molecular weight hydrocarbons; and in general for the conversion of hydrocarbons at elevated temperature wherein chemical changes are brought about by contacting the hydrocarbons either in vapor or liquid phase with solid, refractory catalysts, there is generally formed on the catalyst a deposit of carbon or coke which must be periodically removed to maintain or restore catalyst activity. This regeneration is usually brought about by treatment with air under controlled conditions to regulate the temperature and avoid excessive heating of the catalyst by the exothermic regeneration which would bring about permanent deactivation. The alternate conversion and regeneration periods form a cycle which varies in duration ordinarily from 20 minutes to several hours, for example 2 to 20 hours, depending on the rapidity of carbon deposition. Accordingly the catalyst is subjected to severe physical stresses resulting from changes of temperature, changes in the gaseous atmosphere with which the catalyst is permeated, etc. In fixed bed processes the catalyst is subjected to considerable pressure from the weight of catalyst in the bed which tends to crush the catalyst particles and effect disintegration to a fine state of subdivision which results in plugging the spaces between the catalyst grains, thereby interfering with the flow of reacting vapors thru the catalyst bed. To mitigate this difficulty, catalysts have generally been pelleted under high pressure, an expensive operation in catalyst manufacture.

In the so-called "fluid process" the catalyst has been used in the form of a fine powder which is transferred from the reaction zone to the regeneration zone and back, thereby avoiding the need for pelleting and avoiding the necessity of maintaining macroscopic grain size. However, even in this process the attrition of catalyst particles is considerable and sometimes results in the breakdown of the catalyst to microscopic dimensions of a low order after a great many cycles in the process. When the catalyst particles become exceedingly small, difficulties are encountered in recovering the catalyst from the regeneration gases even though expensive equipment is provided such as electric precipitators, bag filters, etc. Abrasion of the equipment by sharp catalyst particles is also a factor to be considered in the fluid process. It is therefore desirable to employ a catalyst in the fluid process whose particles possess high physical strength and freedom from abrasion of equipment, requirements which are ordinarily contradictory.

According to our invention catalysts are prepared in the form of extremely hard, essentially spherical particles, which are suitable for use in either fixed bed, moving bed, or suspended catalyst operations. In fixed bed and moving bed operations the size of the catalyst particles is considerably coarser than in suspended catalyst operations, for example one-quarter inch to one-sixteenth inch in diameter, and generally not finer than about 60-mesh, whereas in suspended or so-called "fluid" catalyst operations, the catalyst particles are generally much smaller, preferably about 75-150 microns in diameter corresponding to about 100 to 200 mesh, although particles of 50 microns are often satisfactory. Some specifications require 99.5% thru 80 mesh. With the smoothly rounded catalyst particles of the present invention, coarser particles may be employed in the fluid catalyst process without serious abrasion of apparatus and accordingly we may employ catalyst particles of 50 mesh or even coarser under some conditions without serious abrasion difficulties.

In the preparation of our catalyst, we first prepare a sol of the inorganic oxide which we desire to employ in the catalyst. Thus a silicic acid solution or silica sol is prepared by mixing sodium silicate and an acid, for example, hydrochloric or sulfuric acid, employing an excess of acid beyond that necessary for reacting with the sodium in the sodium silicate. The resulting silicic acid is a thin liquid having a concentration of about 10 to 250 grams $SiO_2$ per liter and a hydrogen ion concentration corresponding to a pH of about 2 to 6. This solution is stable for a short time but if allowed to stand quietly, it sets to a gel or silica hydrogel after a period of time which depends upon the concentration of reactants, temperature, pH and the nature of the acid used.

Referring to Figure 1 of the drawing, sodium silicate or water glass solution, containing about 5 to 15 percent $SiO_2$ by way of example, is introduced by line 10 into mixer 11 where it is mixed rapidly with a solution of sulfuric acid (e. g., 10%) introduced by line 12. As rapidly as it is prepared, the silicic acid is conducted by line 13 and distributor connections 14 to colander 15 in the upper part of coagulation chamber 16. The colander 15 is provided with holes or drip nozzles 17 in the bottom thereof, allowing the silicic acid to drip into the coagulation chamber which is substantially filled with an oil. It is preferred to have the level of oil in 16 sufficiently high to allow the droplets of silicic acid to form quietly beneath the surface, thereby avoiding distortion or rupture of droplets on striking the surface of the oil in 16 as sometimes happens when the colander is placed substantially above the level of the oil in the coagulation chamber. However, a very slight elevation, e. g. the length of an elongated droplet in formation, is permissible.

The size of the droplets which are formed and introduced into the oil in 16 is controlled by controlling the character of the surface from which the droplets are formed. The use of orifices drawn to a point, i. e. orifices having a small horizontal area, provides droplets of small diameter, whereas if the droplets form on a perforated flat surface they will be larger. The nature of the oil also affects the size of the droplets when formed below the surface thereof. Thus the density of the oil is an important factor and if the oil density is only slightly lower than the density of the sol, large droplets are produced. The surface tension of the oil will also affect the drop size and various materials may be added to the oil to change the surface tension and thus alter the drop size. For this purpose there may be added to the oil small amounts, usually about one percent, of red oil, Turkey red oil, sperm oil, mahogany acid or soap, or other surface tension controller.

The oil employed in chamber 16 may have a viscosity within a rather wide range but it is desirable that the density be slightly below the density of the silicic acid or other sol which is introduced. If the density of the coagulation oil is only slightly lower than that of the silicic acid, the droplets of silicic acid formed at the orifice of colander 15 will fall quite slowly thru the oil, allowing sufficient time for an incipient coagulation to occur and providing droplets with sufficient strength to resist rupture in the subsequent treatment. By "incipient coagulation" we mean the formation of a film or envelope of gel surrounding the droplet of sol. The time provided for incipient coagulation may be extended as desired by increasing the height of the coagulation chamber 16, i. e. by increasing the depth of the oil therein. By using oils of higher viscosity the time of settling of the oil particles may be still further increased. We prefer to use oils having a viscosity in the range of about 60 to 200 Saybolt Universal at 100° F. More viscous oils, e. g. heavy lubricating oils, may be used, however. Also lighter oils, e. g. naptha, kerosene, benzene, toluene, gas oil, etc. are quite satisfactory. Mineral oils are in general quite suitable although the vegetable and animal oils, fish oils, etc., may be used when they have the proper physical characteristics.

As the particles of silicic acid 18 descend thru the oil they undergo partial solidification or gelation and then pass thru interface 19 into an aqueous layer 20 at the bottom of the coagulation chamber. The aqueous layer consists of water or dilute ammonia or other aqueous medium to hasten further coagulation of silicic acid particles into a rigid gel structure capable of withstanding considerable distortion and pressure without breaking. The particles roll or slide down the inclined bottom 21 and are directed by trough or baffles 22 into the buckets of conveyor 23. The conveyor buckets may be constructed with fine screen cloth to retain the catalyst gel particles while allowing the ambient liquid to drain therefrom. If desired, oil film adhering to the catalyst may be removed by extraction with a light solvent. The catalyst is thence conducted by the conveyor into the upper end of slightly inclined wash trough 24 supplied with copious amounts of water, preferably distilled water, thru manifolded wash line 25. If desired, the washing may be made to take place countercurrently and for this purpose a wash table or concentrating jig table may be employed, the water flowing downward and the cataylst particles passing upward and off at the top of the table in the manner well known in the mining industry.

The washed catalyst leaving the lower end of trough 24 falls onto screen conveyor 26 where the water drains away and the catalyst is conducted thru drying oven 27 supplied by a current of dry air, or the oven may be heated by burner 28 to speed up the drying operation. Care must be taken in drying to prevent coalescence or rupture of gel particles. Slow drying in warm air is usually satisfactory, and a drying tower with ascending air thru which the catalyst is allowed to fall freely, may be employed. Other methods of drying may be employed, for example, drying by absorption of water in a liquid, e. g. alcohol, acetone, ethylene glycol, glycerol, methanol, acetic acid, etc. By this method the gel particles are introduced into the water-absorbing liquid and maintained in suspension therein while the water is extracted and replaced by the dehydrating liquid, generally in a series of stages of decreasing water concentration. When the water has been largely displaced from the gel particles the drying is completed by evaporation in an oven arranged for solvent recovery.

After drying, the catalyst gel particles may be ignited in a final operation to put them in condition for use in hydrocarbon conversion. A temperature of 800–1200° F. may be reached in ignition. As finally prepared the catalyst is a free-flowing "sand" of varying degrees of fineness depending upon the manner of preparation, the particles of which are essentially spherical and hard. Depending on the control of the coagulation step of the process, the particles are more or less uniform in size.

If desired, the catalyst may be screened to eliminate particles coarser or finer than the desired particle size, and the eliminated material may be used for other purposes. To control particle size, the colander 15 may be selected with fine or coarse holes. Also, the density and surface tension of the oil in 16 may be modified to give large or small droplets, 18. The depth of the layer of oil in coagulation chamber 16 may be readily increased or decreased by adding oil or withdrawing oil thru draw-off connection 29. Likewise the aqueous layer in the bottom of coagulation chamber 16 may be continuously renewed by adding water or dilute ammonia or other precipitating liquid thru nozzle 30 directed into the chamber 31 surrounding conveyor 23. The aqueous liquid may be continuously withdrawn thru overflow line 32.

The amount of ammonia employed in the aqueous phase in the coagulation chamber is sufficient to maintain the pH at 8 or higher. The particles after passing from the oil to the aqueous phase in 18 are thus rapidly set to a firm hydrogel before contacting with solid surfaces which might otherwise bring about rupture or disintegration of the particles.

Rapid solidification or coagulation of the droplets of sol supplied to the oil in chamber 16 may also be facilitated by adding various coagulating agents to the oil itself. Thus we may add an oil soluble base, for example pyridine, aniline, tributyl amine, diethyl amine, etc., to the oil, generally in amounts of one to ten percent or less. Even a very small amount of basic reagent in the oil layer serves to provide an envelope or "skin" of coagulated sol which imparts to the droplet sufficient strength to resist rupture when passing thru the interface 19 into the aqueous layer. When employing oil soluble coagulants in the oil layer in 16 we may replenish the coagulant from time to time to maintain the desired concentration. For the sake of uniformity, the condition and composition of the oil is continually or periodically adjusted by recirculating the oil thru chamber 16 into an outside reservoir, not shown, avoiding turbulence in the bath 16. Thus the density of the oil may be closely controlled by adding to it a heavier or lighter ingredient. Suitable density increasing liquids are the aromatic hydrocarbons, benzene, toluene, xylene, chlorinated hydrocarbons such as chlorinated diphenyls, chlorinated paraffins and the alkyl chlorides, carbon tetrachloride, chloroform, ethylene dichloride, etc. Various other density increasing oil soluble liquids such as nitrobenzene, carbon disulfide, ethylene dibromide, etc. will be obvious to those skilled in the art. The amount required will vary with the density of the oil employed and, in general, sufficient of the density adjusting liquid will be added to maintain the density in the range of about 0.8 to 1. In the case where the sol being employed has a density appreciably above 1, it may be desirable to employ an oil with a density above 1 and slightly below the density of the sol. In this case the density of the water layer in the bottom of coagulation chamber 16 may be increased by the addition of salts, for example ammonium chloride or ammonium sulfate, to maintain the density of the aqueous layer slightly above that of the oil in order to prevent inversion of the oil layer and aqueous layer in the coagulation chamber.

In another modification of our invention shown in Figure 2, we may spray the sol, for example silicic acid, directly into a vapor chamber. Thus a silicic acid sol prepared as hereinabove described may be introduced by line 40 into chamber 41 using a nozzle 42 to provide a suitable particle size. The particles of sol then fall freely thru the gas in chamber 41 and become coagulated before reaching the bottom. The chamber 41 should be of sufficient width to avoid direct impingement of the sol particles on the walls. The coagulation of the particles of sol in chamber 41 may be facilitated by supplying the chamber with an upflowing current of dry air or other gas which serves to dry the particles and form a tough skin of gel thereon which serves to prevent rupture in subsequent handling. For this purpose air may be introduced at 43 passing out thru vent 44. The upward current of gases in the chamber serves to buoy up the particles of sol and retard their settling, thereby providing a longer time for the unstable sol to coagulate. Rate of gelling can be controlled by regulating the humidity of the upflowing gases. The gelling action may also be hastened by the addition of a coagulating agent, for example ammonia or methylamine vapor introduced by line 45, the ammonia or methylamine dissolving in the surface layer of the particle and causing the formation of a skin of coagulated sol thereon.

When the catalyst particles reach the bottom of the chamber they may be sufficiently coagulated to be handled mechanically, for example, they may be allowed to flow en masse thru outlet 46, and thence the particles may be conducted to a washing operation or in some cases, for example as in the case of alumina sols, the particles may be dried directly without washing.

In order to prevent adhesion of particles or rupture thereof when reaching the bottom of the coagulation chamber 41, we prefer to maintain a water layer at the bottom by introducing a current of water thru line 47. The water layer may also be charged with sufficient ammonia to complete the coagulation of the gel particles. The coagulated particles of catalyst settle thru the water layer and are drawn off at 46 periodically by gate 48. Instead of maintaining a layer or pool of water or aqueous liquid in the base of 41, we may alternatively employ a film of water flowing across the inclined bottom of the chamber.

Although we have described our process especially as applied to the preparation of silica gel type catalysts, it is obvious that it may be applied to the preparation of catalysts of other substances, for example the oxides of aluminum, chromium, molybdenum, magnesium, titanium, zirconium, cobalt, nickel or iron, etc., and in fact any metal capable of forming an oxide gel from a metastable sol. We may also modify the character of any of these gel catalysts by combining with them the oxides or salts of other metals which act as activators or promoters, as will be hereinafter described.

In applying our process to the formation of alumina catalysts we may prepare an alumina sol from amalgamated aluminum metal and dilute acid in accordance with the method of U. S. Patent Reissue 22,196 (October 6, 1942). In this case the alumina sol is introduced into distributor or colander 15 and formed into droplets which are coagulated in the oil layer in 16 then falling into the aqueous layer 20. The aqueous layer employed for this purpose may be ordinary water or may contain a coagulating agent such as ammonium carbonate or certain organic bases, or an acid, preferably in highly dilute form, e. g. 0.01 to 5 percent. In general any dilute electrolyte may be used. Likewise, the oil employed in 16 for initially coagulating the alumina sol may contain as a coagulation accelerator a suitable organic base or organic acid. Hydrogen fluoride may be added to the oil continuously, if desired, for the same purpose, the amount required being very small, generally less than one percent.

When preparing alumina catalysts in this manner we may omit the washing step in 24, drying the catalyst directly from the coagulating apparatus. In the case of silicic acid catalysts it is generally highly desirable to remove as much of the sodium ion as possible by thoro washing because of its deleterious effect on catalyst life when in use.

Silicic acid catalyst may be suitably promoted by adding thereto alumina, magnesia, or other promoter, generally in amounts of 1 to 30 percent. The alumina or magnesia may be adsorbed from solution by employing salts of aluminum or magnesium in the aqueous liquid in the bottom of coagulating chamber 16, thus providing silica gel particles having $Al_2O_3$ or $MgO$ deposited in the surface layer surrounding each particle. Alternatively, the alumina and/or magnesia may be mixed or precipitated with the silicic acid in mixer 11 by adding a solution of aluminum salt or magnesium salt to the precipitator while making the silicic acid. On coagulation of the silica sol by contact with ammonia, the magnesia or alumina is thereupon precipitated within the silica gel particles and is retained therein.

Likewise, in preparing alumina catalysts we may employ the oxides of vanadium or the group VI metals, particularly chromium or molybdenum, in much the same manner as promoters. For example, ammonium molybdate may be incorporated in the alumina sol supplied to the distributor 15, the amount of molybdena being preferably about 5 to 12 percent of the weight of final catalyst. Alternatively, chromium, molybdenum or vanadium compounds as well as compounds of nickel, copper, cobalt or other suitable activating metal, may be dissolved in the acid solution in the bottom of the coagulating chamber 16, the activated metal oxide or hydroxide being adsorbed on the particles of alumina gel as rapidly as formed. Alumina catalysts made in this manner containing about 6–10% of $MoO_3$ are especially suitable for use in fixed beds for the reforming of gasoline to produce high knock rating motor fuels, and for the manufacture of aromatic hydrocarbons, benzene, toluene, xylene, etc., from petroleum naphtha fractions. The catalyst in spherical granules of ¼ inch diameter or larger to 40 mesh is placed in a bed in a container and hot vapors of naptha are passed thru at a temperature of about 850 to 1100° F. and about 200–400 pounds per square inch pressure, preferably in "hydroforming" with added hydrogen in the proportion of about 1 to 5 mols per mol of naptha treated. A space velocity of 0.2 to 3 volumes of naptha per hour per gross volume of catalyst is satisfactory.

Having thus described our invention, what we claim is:

1. The process of making spheroidal solid contact catalysts of high physical strength which comprises forming into droplets a stable inorganic oxide sol in a first liquid supporting medium immiscible with said sol and containing a coagulating agent therefor, regulating the composition of said sol to produce droplets in spheroidal form in said supporting medium, maintaining said droplets in suspension in said medium for sufficient time to effect partial gelation of said sol and confer sufficient mechanical strength on said droplets to prevent rupture in subsequent handling, and finally completing the gelation of said droplets by passing them into a second liquid supporting medium immiscible with said first liquid medium and in contact therewith comprising an aqueous liquid containing a coagulating agent for said sol, and thereafter removing the resulting gel particles from said aqueous liquid and drying them without coalescence.

2. The process of claim 1 wherein a small amount of a promoter metal oxide is incorporated in said catalyst by adding a compound of said promoter metal to the sol before the formation of said droplets.

3. The process of claim 1 wherein a small amount of a promoter metal oxide is incorporated in said catalyst by dissolving a compound of the promoter metal in said second liquid supporting medium.

4. The process of making catalysts which comprises producing a stable inorganic oxide sol, forming the sol into droplets in a first liquid supporting medium immiscible with said sol and containing a coagulating agent therefor, partially coagulating the droplets in said first liquid supporting medium, thereafter completing the coagulation of said droplets in a second liquid supporting medium comprising an aqueous phase immiscible with said first liquid supporting medium and in contact therewith, thereby forming said droplets into particles of a firm gel and thereafter drying said gel particles.

5. The process of claim 4 wherein said first liquid supporting medium is a hydrocarbon oil and said second liquid supporting medium is a solution of a salt of a promoter metal.

6. The process of making subdivided solid contact catalysts which comprises injecting an inorganic oxide sol into a layer of oil containing a coagulating agent, thereby forming spheroidal droplets of said sol within said oil and partially gelling said droplets by the action of said coagulating agent, maintaining the density of said oil slightly lower than the density of said sol, thereby allowing said droplets to settle thru said oil layer, maintaining a water solution of a coagulating reagent below said oil layer and in contact therewith and completing the coagulation of said droplets within said water solution.

7. The process of making silica gel in the form of spheroidal granules suitable for use as a contact catalyst which comprises preparing a stable silicic acid sol, introducing said silicic acid sol in the form of droplets into a first liquid supporting medium immiscible with said sol and containing a coagulating agent therefor, maintaining said droplets in suspension in said liquid medium for a sufficient time to permit partial coagulation of said droplets and to substantially increase their mechanical strength, transferring said droplets to a second liquid supporting medium comprising an aqueous solution immiscible with said first liquid medium and in contact therewith, said second liquid medium containing a coagulating agent for said silicic acid sol, whereby said droplets of sol are completely converted to a gel substantially without coalescence and thereafter washing and drying the resulting particles of gel.

8. The process of claim 7 wherein the second liquid supporting medium contains ammonia as the coagulating agent.

9. The process of making active alumina gel catalysts in the form of granules of essentially spheroidal form and high physical strength comprising introducing a metastable alumina sol in the form of droplets into an immiscible first liquid coagulating medium containing a coagulating agent for said sol, maintaining the droplets of said sol in suspension in said medium for a sufficient time to permit partial coagulation thereof to alumina gel without substantially altering the form of said droplets, passing said droplets into a second liquid coagulating medium immiscible with said first coagulating medium and in contact therewith, said second liquid medium comprising an aqueous solution containing a coagulating agent for said sol, completing the gelation of said alumina sol in said second coagulating medium, thereby producing firm spheroidal particles of alumina gel, removing said spheroidal particles of alumina gel from said second coagulating medium and drying them substantially without coalescence to produce the desired aluminum oxide catalyst.

HENRY TRUEHEART BROWN.
RODNEY V. SHANKLAND.

REFERENCES CITED

The following references are of record in the file of this patent:

UNITED STATES PATENTS

| Number | Name | Date |
| --- | --- | --- |
| 1,297,724 | Patrick | Mar. 18, 1919 |
| 1,506,118 | Govers | Aug. 26, 1924 |
| 1,755,496 | Behrman | Apr. 22, 1930 |
| 1,843,576 | McClure et al. | Feb. 2, 1932 |
| 1,949,360 | Schorger | Feb. 27, 1934 |
| 2,024,131 | Newton et al. | Dec. 10, 1935 |
| 2,085,129 | Stoewener | June 29, 1937 |
| 2,203,825 | Komarewsky | June 11, 1940 |
| 2,206,021 | Blunck | July 2, 1940 |
| 2,280,650 | Kassel | Apr. 21, 1942 |
| 2,284,248 | Baker et al. | May 26, 1942 |
| 2,302,297 | Connolly | Nov. 17, 1942 |
| 2,326,523 | Connolly et al. | Aug. 10, 1943 |
| 2,384,946 | Marisic | Sept. 18, 1945 |
| 2,387,596 | Marisic | Oct. 23, 1945 |

FOREIGN PATENTS

| Number | Country | Date |
| --- | --- | --- |
| 392,954 | Great Britain | May 22, 1933 |